US012211156B2

United States Patent
Smith et al.

(10) Patent No.: US 12,211,156 B2
(45) Date of Patent: *Jan. 28, 2025

(54) CONTEXT BASED AUGMENTED REALITY COMMUNICATION

(71) Applicant: Snap Inc., Santa Monica, CA (US)

(72) Inventors: Brian Anthony Smith, New York, NY (US); Yu Jiang Tham, Los Angeles, CA (US); Rajan Vaish, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/163,098

(22) Filed: Feb. 1, 2023

(65) Prior Publication Data

US 2023/0177786 A1 Jun. 8, 2023

Related U.S. Application Data

(63) Continuation of application No. 17/210,291, filed on Mar. 23, 2021, now Pat. No. 11,593,997.

(Continued)

(51) Int. Cl.
 *G06T 19/00* (2011.01)
 *G06F 3/01* (2006.01)
 (Continued)

(52) U.S. Cl.
 CPC ............ *G06T 19/006* (2013.01); *G06F 3/011* (2013.01); *G06F 3/0481* (2013.01); *G06F 3/04847* (2013.01); *G06T 2200/24* (2013.01)

(58) Field of Classification Search
 CPC ... G06T 19/006; G06T 2200/24; G06F 3/011; G06F 3/0481; G06F 3/04847
 See application file for complete search history.

(56) References Cited

U.S. PATENT DOCUMENTS 10,353,532 B1 7/2019 Holz et al.
10,897,564 B1 1/2021 Smith et al.
(Continued)

FOREIGN PATENT DOCUMENTS

CN 1011256597 A1 9/2008
CN 115668102 1/2023
(Continued)

OTHER PUBLICATIONS

"U.S. Appl. No. 16/443,614, Non Final Office Action mailed Jun. 2, 2020", 7 pgs.

(Continued)

*Primary Examiner* — William A Beutel
(74) *Attorney, Agent, or Firm* — Schwegman Lundberg & Woessner, P.A.

(57) ABSTRACT

Aspects of the present disclosure involve a system comprising a computer-readable storage medium storing at least one program, method, and user interface to facilitate context based augmented reality communication between multiple users over a network. Virtual content item configuration data indicative of a selection by a first user of virtual content item to apply to a real-world environment that is visible to a second user via a second device is received from a first device. The virtual content item configuration data also includes one or more criteria to trigger application of the virtual content item to the real-world environment. A triggering event is detected based on satisfaction of the one or more criteria determined from context data generated at the second device. The second device presents the virtual content item overlaid on the real-world environment that is visible to the second user based on the triggering event.

20 Claims, 8 Drawing Sheets

Related U.S. Application Data

(60) Provisional application No. 63/002,849, filed on Mar. 31, 2020.

(51) Int. Cl.
*G06F 3/0481* (2022.01)
*G06F 3/04847* (2022.01)

(56) References Cited

U.S. PATENT DOCUMENTS

| | | | |
|---|---|---|---|
| 11,064,113 B1 | 7/2021 | Weber et al. | |
| 11,290,632 B2 | 3/2022 | Smith et al. | |
| 11,340,857 B1 | 5/2022 | Smith et al. | |
| 11,593,997 B2 | 2/2023 | Smith et al. | |
| 11,606,491 B2 | 3/2023 | Smith et al. | |
| 11,829,679 B2 | 11/2023 | Smith et al. | |
| 11,856,288 B2 | 12/2023 | Smith et al. | |
| 11,985,175 B2 | 5/2024 | Smith et al. | |
| 2006/0170652 A1 | 8/2006 | Bannai et al. | |
| 2007/0024527 A1 | 2/2007 | Heikkinen et al. | |
| 2008/0034040 A1 | 2/2008 | Wherry et al. | |
| 2009/0237328 A1 | 9/2009 | Gyorfi et al. | |
| 2011/0161507 A1 | 6/2011 | Osullivan et al. | |
| 2012/0081393 A1 | 4/2012 | Kim | |
| 2012/0198531 A1 | 8/2012 | Ort et al. | |
| 2012/0249741 A1* | 10/2012 | Maciocci | G06T 19/006 348/51 |
| 2013/0178257 A1 | 7/2013 | Langseth | |
| 2013/0293468 A1 | 11/2013 | Perez et al. | |
| 2014/0043426 A1 | 2/2014 | Bicanic et al. | |
| 2014/0132630 A1 | 5/2014 | Mun et al. | |
| 2014/0372540 A1 | 12/2014 | Libin | |
| 2015/0235267 A1* | 8/2015 | Steube | G06V 20/20 705/14.58 |
| 2016/0066036 A1 | 3/2016 | Felt et al. | |
| 2016/0100034 A1 | 4/2016 | Miller | |
| 2016/0133230 A1 | 5/2016 | Daniels et al. | |
| 2016/0217623 A1 | 7/2016 | Singh | |
| 2016/0260256 A1* | 9/2016 | Shefi | G06T 19/006 |
| 2017/0021273 A1 | 1/2017 | Rios | |
| 2017/0160815 A1 | 6/2017 | Glazier et al. | |
| 2017/0352187 A1* | 12/2017 | Haines | G06T 19/006 |
| 2018/0205797 A1 | 7/2018 | Faulkner | |
| 2018/0295271 A1 | 10/2018 | Kim | |
| 2018/0322706 A1 | 11/2018 | Drouin et al. | |
| 2019/0068390 A1 | 2/2019 | Gross et al. | |
| 2019/0107990 A1* | 4/2019 | Spivack | G06T 11/60 |
| 2019/0318540 A1 | 10/2019 | Piemonte et al. | |
| 2019/0391724 A1 | 12/2019 | Holz et al. | |
| 2020/0045519 A1 | 2/2020 | Raleigh et al. | |
| 2020/0186576 A1 | 6/2020 | Gopal et al. | |
| 2020/0244711 A1 | 7/2020 | Engel et al. | |
| 2020/0371673 A1 | 11/2020 | Faulkner | |
| 2021/0105397 A1 | 4/2021 | Smith et al. | |
| 2021/0304450 A1 | 9/2021 | Smith et al. | |
| 2021/0304507 A1 | 9/2021 | Smith et al. | |
| 2021/0306386 A1 | 9/2021 | Smith et al. | |
| 2021/0306387 A1 | 9/2021 | Smith et al. | |
| 2022/0182530 A1 | 6/2022 | Smith et al. | |
| 2022/0214856 A1 | 7/2022 | Smith et al. | |
| 2023/0188837 A1 | 6/2023 | Smith et al. | |
| 2024/0031674 A1 | 1/2024 | Smith et al. | |
| 2024/0036805 A1 | 2/2024 | Smith et al. | |
| 2024/0195848 A1 | 6/2024 | Smith et al. | |

FOREIGN PATENT DOCUMENTS

| | | |
|---|---|---|
| CN | 115668891 | 1/2023 |
| CN | 115668897 | 1/2023 |
| CN | 115698908 | 2/2023 |
| KR | 102515040 | 3/2023 |
| WO | WO-2016103115 A1 | 6/2016 |
| WO | WO-2019005703 A2 | 3/2019 |
| WO | WO-2021195100 A1 | 9/2021 |
| WO | WO-2021195125 A1 | 9/2021 |
| WO | WO-2021195233 A1 | 9/2021 |
| WO | WO-2021202241 A1 | 10/2021 |

OTHER PUBLICATIONS

"U.S. Appl. No. 16/443,614, Notice of Allowance mailed Sep. 14, 2020", 8 pgs.

"U.S. Appl. No. 16/443,614, Notice of Allowance mailed Sep. 23, 2020", 5 pgs.

"U.S. Appl. No. 16/443,614, Response filed Aug. 24, 20 to Non Final Office Action mailed Jun. 2, 2020", 9 pgs.

"U.S. Appl. No. 16/947,083, 312 Amendment filed Apr. 14, 2022", 7 pgs.

"U.S. Appl. No. 16/947,083, Corrected Notice of Allowability mailed Apr. 26, 2022", 3 pgs.

"U.S. Appl. No. 16/947,083, Examiner Interview Summary mailed Nov. 8, 2021", 2 pgs.

"U.S. Appl. No. 16/947,083, Final Office Action mailed Aug. 6, 2021", 29 pgs.

"U.S. Appl. No. 16/947,083, Non Final Office Action mailed Mar. 19, 2021", 26 pgs.

"U.S. Appl. No. 16/947,083, Notice of Allowance mailed Jan. 21, 2022", 12 pgs.

"U.S. Appl. No. 16/947,083, Response filed Jul. 13, 2021 to Non Final Office Action mailed Mar. 19, 2021", 11 pgs.

"U.S. Appl. No. 16/947,083, Response filed Nov. 8, 2021 to Final Office Action mailed Aug. 6, 2021", 12 pgs.

"U.S. Appl. No. 17/125,298, Non Final Office Action mailed Aug. 16, 2021", 8 pgs.

"U.S. Appl. No. 17/125,298, Notice of Allowance mailed Nov. 26, 2021", 8 pgs.

"U.S. Appl. No. 17/125,298, Response filed Nov. 9, 2021 to Non Final Office Action mailed Aug. 16, 2021", 8 pgs.

"U.S. Appl. No. 17/206,991, Non Final Office Action mailed Oct. 20, 2022", 13 pgs.

"U.S. Appl. No. 17/206,991, Response filed Jan. 18, 2023 to Non Final Office Action mailed Oct. 20, 2022", 12 pgs.

"U.S. Appl. No. 17/207,080, Non Final Office Action malled Oct. 6, 2022", 9 pgs.

"U.S. Appl. No. 17/207,080, Response filed Jan. 5, 2023 to Non Final Office Action mailed Oct. 6, 2022", 11 pgs.

"U.S. Appl. No. 17/207,174, Non Final Office Action mailed Oct. 6, 2022", 15 pgs.

"U.S. Appl. No. 17/207,174, Response filed Jan. 5, 2023 to Non Final Office Action mailed Oct. 6, 2022", 10 pgs.

"U.S. Appl. No. 17/210,291, 312 Amendment filed Jan. 9, 2023", 9 pgs.

"U.S. Appl. No. 17/210,291, Corrected Notice of Allowability mailed Oct. 26, 2022", 2 pgs.

"U.S. Appl. No. 17/210,291, Examiner Interview Summary mailed Dec. 27, 2021", 3 pgs.

"U.S. Appl. No. 17/210,291, Final Office Action mailed Feb. 2, 2022", 51 pgs.

"U.S. Appl. No. 17/210,291, Non Final Office Action mailed May 13, 2022", 50 pgs.

"U.S. Appl. No. 17/210,291, Non Final Office Action mailed Sep. 22, 2021", 37 pgs.

"U.S. Appl. No. 17/210,291, Notice of Allowance mailed Oct. 19, 2022", 8 pgs.

"U.S. Appl. No. 17/210,291, Response filed May 2, 2022 to Final Office Action mailed Feb. 2, 2022", 11 pgs.

"U.S. Appl. No. 17/210,291, Response filed Sep. 13, 2022 to Non Final Office Action mailed May 13, 2022", 11 pgs.

"U.S. Appl. No. 17/210,291, Response filed Dec. 22, 2021 to Non Final Office Action mailed Sep. 22, 2021", 12 pgs.

"U.S. Appl. No. 17/210,291, Supplemental Notice of Allowability mailed Jan. 19, 2023" 11 pgs.

"U.S. Appl. No. 17/679,616, Notice of Allowance mailed Nov. 7, 2022", 9 pgs.

(56) References Cited

OTHER PUBLICATIONS

"International Application Serial No. PCT/US2021/023712, International Preliminary Report on Patentability mailed Oct. 6, 2022", 8 pgs.
"International Application Serial No. PCT/US2021/023712, International Search Report mailed Jun. 29, 2021", 4 pgs.
"International Application Serial No. PCT/US2021/023712, Written Opinion mailed Jun. 29, 2021", 6 pgs.
"International Application Serial No. PCT/US2021/023748, International Preliminary Report on Patentability mailed Oct. 6, 2022", 8 pgs.
"International Application Serial No. PCT/US2021/023748, International Search Report mailed Jun. 29, 2021", 4 pgs.
"International Application Serial No. PCT/US2021/023748, Written Opinion mailed Jun. 29, 2021". 6 pgs.
"International Application Serial No. PCT/US2021/023918, International Preliminary Report on Patentability mailed Oct. 6, 2022", 9 pgs.
"International Application Serial No. PCT/US2021/023918, International Search Report mailed Jun. 28, 2021", 4 pgs.
"International Application Serial No. PCT/US2021/023918, Written Opinion mailed Jun. 28, 2021", 7 pgs.
"International Application Serial No. PCT/US2021/024180, International Preliminary Report on Patentability mailed Oct. 13, 2022", 6 pgs.
"International Application Serial No. PCT/US2021/024180, International Search Report mailed Jul. 6, 2021", 5 pgs.
"International Application Serial No. PCT/US2021/024180, Written Opinion mailed Jul. 6, 2021", 4 pgs.
Payette, Chuck, et al., "Enabling reliable and efficient wireless video uplink", Bell Labs Technical Journal, Wiley, CA, US, vol. 16, No. 2, (Sep. 1, 2011), 169-191.
"European Application Serial No. 21779785.1, Response Filed Dec. 2, 2022 to Communication pursuant to Rules 161(2) and 162 EPC mailed Nov. 9, 2023", 25 pgs.
"Application Serial No. 17 679,616, Corrected Notice of Allowability mailed Feb. 15, 2023", 2 pgs.
"Application Serial No. 17 206,991, Final Office Action mailed Feb. 16, 2023", 14 pgs.
"Application Serial No. 17 206,991, Examiner Interview Summary mailed Feb. 22, 2023", 2 pgs.
"Application Serial No. 17 703,567, Non Final Office Action mailed Mar. 31, 2023", 13 pgs.
"Application Serial No. 17 207,174, Final Office Action mailed Apr. 27, 2023", 17 pgs.
"Application Serial No. 17 207,080, Final Office Action mailed Apr. 28, 2023", 11 pgs.
"Application Serial No. 17 206,991, Response filed May 8, 2023 to Final Office Action mailed Feb. 16, 2023", 13 pgs.
"Application Serial No. 17 703,567, Response filed Jun. 14, 2023 to Non Final Office Action mailed Mar. 31, 2023", 9 pgs.
"Application Serial No. 17 206,991, Non Final Office Action mailed Jun. 29, 2023", 21 pgs.
"Application Serial No. 17 703,567, Notice of Allowance mailed Jul. 13, 2023", 7 pgs.
"Application Serial No. 18 165,777, Notice of Allowance mailed Jul. 19, 2023", 9 pgs.
"Application Serial No. 17 207,080, Response filed Jul. 27, 2023 to Final Office Action mailed Apr. 28, 2023", 12 pgs.
"Application Serial No. 17 207,174, Response filed Jul. 27, 2023 to Final Office Action mailed Apr. 27, 2023", 13 pgs.
"Application Serial No. 17 207,080, Non Final Office Action mailed Aug. 16, 2023", 14 pgs.
"Application Serial No. 17 207,174, Non Final Office Action mailed Sep. 1, 2023", 16 pgs.
"Application Serial No. 17 206,991, Response filed Sep. 28, 2023 to Non Final Office Action mailed Jun. 29, 2023", 12 pgs.
"Application Serial No. 17 206,991, Examiner Interview Summary mailed Oct. 5, 2023", 2 pgs.
"Application Serial No. 17 703,567, Corrected Notice of Allowability mailed Oct. 11, 2023", 2 pgs.
"U.S. Appl. No. 17/206,991, Response filed Jan. 16, 2024 to Final Office Action mailed Nov. 16, 2023", 14 pgs.
"U.S. Appl. No. 17/207,080, Final Office Action mailed Nov. 28, 2023", 13 pgs.
"U.S. Appl. No. 17/207,174, Examiner Interview Summary mailed Dec. 8, 2023", 2 pgs.
"U.S. Appl. No. 17/207,174, Notice of Allowance mailed Jan. 5, 2024", 16 pgs.
"U.S. Appl. No. 17/207,174, Response filed Nov. 30, 2023 to Non Final Office Action mailed Sep. 1, 2023", 13 pgs.
"U.S. Appl. No. 18/165,777, Corrected Notice of Allowability mailed Nov. 22, 2023", 2 pgs.
"Application Serial No. 17 207,080, Response filed Nov. 10, 2023 to Non Final Office Action mailed Aug. 16, 2023", 10 pgs.
"Application Serial No. 17 206,991, Final Office Action mailed Nov. 16, 2023", 25 pgs.
"U.S. Appl. No. 17/207,080, Notice of Allowance mailed Mar. 22, 2024", 7 pgs.
"U.S. Appl. No. 17/207,080, Response filed Feb. 21, 2024 to Final Office Action mailed Nov. 28, 2023", 12 pgs.
"European Application Serial No. 21718750.9, Communication Pursuant to Article 94(3) EPC mailed Mar. 5, 2024", 4 pgs.
"European Application Serial No. 21718752.5, Communication Pursuant to Article 94(3) EPC mailed Mar. 13, 2024", 5 pgs.
"European Application Serial No. 21779785.1, Extended European Search Report mailed Feb. 5, 2024", 12 pgs.
"U.S. Appl. No. 17/206,991, Non Final Office Action mailed Apr. 4, 2024", 24 pgs.
"U.S. Appl. No. 17/207,174, Corrected Notice of Allowability mailed Apr. 8, 2024", 2 pgs.
"Korean Application Serial No. 10-2022-7036916, Notice of Preliminary Rejection mailed Jun. 5, 2024", w/ English Translation, 4 pgs.
"European Application Serial No. 21718771.5, Communication Pursuant to Article 94(3) EPC mailed Jul. 4, 2024", 8 pgs.
"European Application Serial No. 21779785.1, Response filed Aug. 8, 2024 to Extended European Search Report mailed Feb. 5, 2024", 25 pgs.
"U.S. Appl. No. 17/206,991, Notice of Allowance mailed Aug. 2, 2024", 10 pgs.
"U.S. Appl. No. 17/206,991, Response filed Jul. 5, 2024 to Non Final Office Action mailed Apr. 4, 2024", 13 pgs.

* cited by examiner

CONTEXT BASED AUGMENTED REALITY COMMUNICATION

CLAIM OF PRIORITY

This application is a continuation of U.S. patent application Ser. No. 17/210,291, filed Mar. 23, 2021, which application claims the benefit of priority to U.S. Provisional Application Ser. No. 63/002,849, filed on Mar. 31, 2020, which is incorporated herein by reference in its entirety.

TECHNICAL FIELD

The present disclosure generally relates to mobile and wearable computing technology. In particular, example embodiments of the present disclosure address systems, methods, and user interfaces to facilitate context based augmented reality based communication between multiple users over a network.

BACKGROUND

Many wearable and mobile devices such as "smart" glasses include an embedded camera. Virtual rendering systems implemented using these types of devices can be used to create engaging and entertaining augmented reality experiences, in which three-dimensional (3D) media object graphics content appears to be present in the real world.

BRIEF DESCRIPTION OF THE DRAWINGS

To easily identify the discussion of any particular element or act, the most significant digit or digits in a reference number refer to the figure number in which that element or act is first introduced.

DETAILED DESCRIPTION

Figure 1:
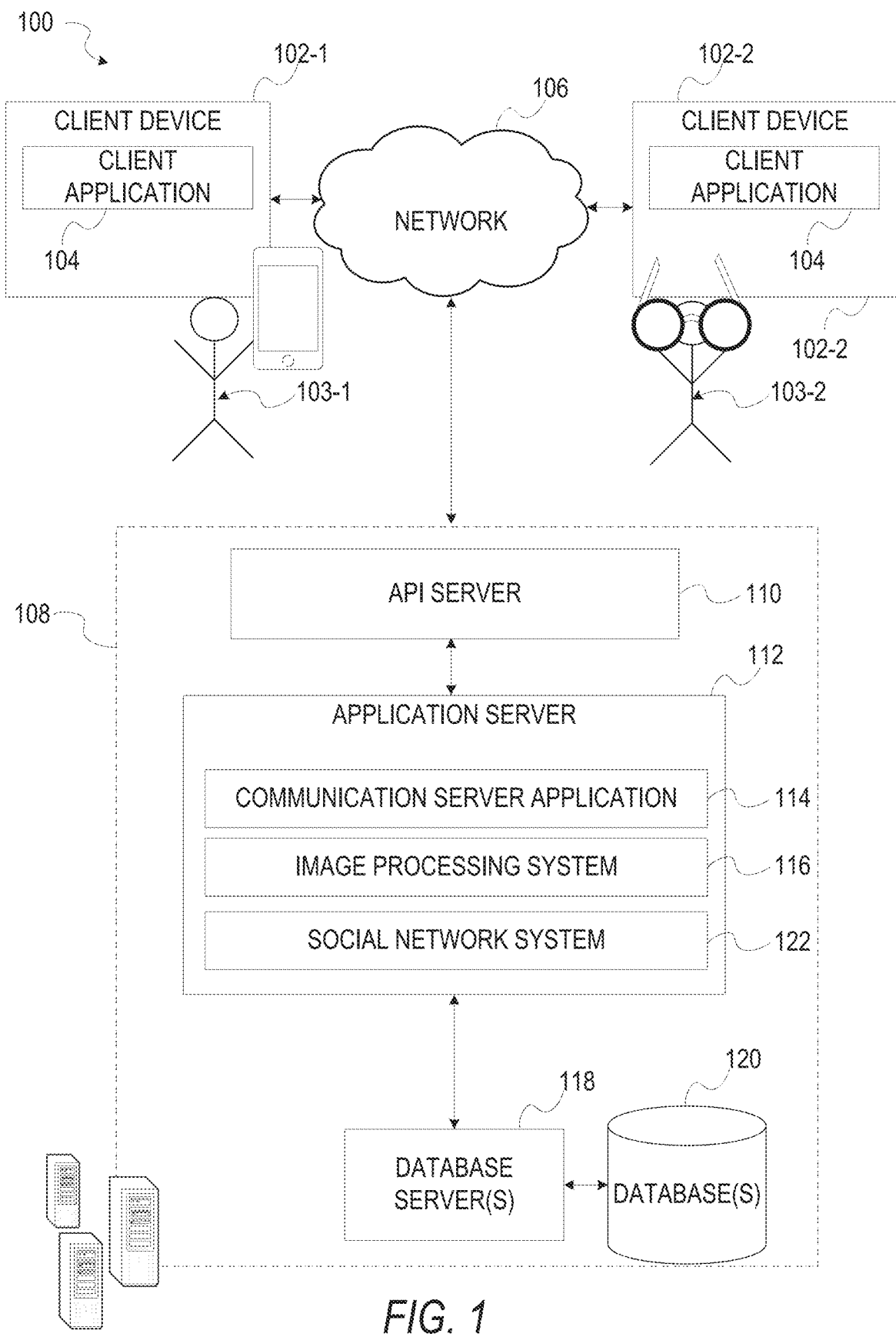
FIG. 1 is a diagrammatic representation of a networked environment in which the present disclosure may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of virtual rendering systems by creating augmented reality experiences that enable users to have context-based communications. These context-based communications are enabled by allowing users to establish criteria to trigger application of virtual content items to each other's view of real-world environments. These triggering criteria relate to contextual information about a recipient user's surrounding environment such as a location, a time, weather conditions, and objects in the surround environment.

As an example, a first user may be wearing a wearable device that includes a camera and optical elements that include a transparent display through which the real-world environment is visible to the first user. A second user use may use a user interface of an application executing on a second device (e.g., a smartphone or wearable device) to select a virtual content item and specify the first user as a recipient for the virtual content item. The virtual content item comprises one or more media objects. The second user can also establish one or more criteria to trigger application of the virtual content item to the real-world environment that is visible to the first user.

Based on the first user being identified as a recipient user of the virtual content item, a communication system monitors contextual data associated with the wearable device to detect a triggering event. A triggering event occurs when the one or more criteria are satisfied based on the context data. In response to detecting a triggering event, the communication system causes the virtual content item selected by the second user can be applied to the real-world environment that is visible to the first user by causing one or more media objects to be presented by the transparent display of the first user's wearable device. In this way, the one or more media objects appear to the first user as though they exist in the real-world environment.

In an example, it is the first user's birthday and the second users wants to surprise the first user with birthday wishes. The second user knows that first user drinks Starbucks® coffee every day, so the first user selects a first virtual content item that includes confetti and configures criteria for applying the virtual content item such that appearance of the Starbucks® logo within the real-world environment of the first user triggers presentation of the confetti overlaid on the real-world environment that is visible to the first user. The second user may further select a second virtual content item that includes a balloon and establish the location of the first user's office as a trigger for rendering the balloon. In addition, the second user may select a third virtual content item that includes fire works and configure the triggering criteria such that the fireworks are presented to the first user at 6 PM. When the first user starts their day with coffee, the first user is surprised with the presentation of confetti by the transparent display of their wearable device. When the first user reaches their office, they are again surprised with the presentation of a balloon by the transparent display of their wearable device. At 6 pm when first user leaves office, the presentation of the third virtual content item makes it appear to the first user that the sky is lit with fireworks. In this manner, the second user was able to communicate in augmented reality with first user using context of the first user (location, time, and objects appearing in the real-world environment of the first user).

FIG. 1 is a block diagram showing an example communication system 100 for exchanging data (e.g., messages and associated content) over a network. The communication system 100 includes multiple instances of a Client device 102, each of which hosts a number of applications including a communication client application 104. Each communication client application 104 is communicatively coupled to other instances of the communication client application 104 and a communication server system 108 via a network 106 (e.g., the Internet).

A communication client application 104 is able to communicate and exchange data with another communication client application 104 and with the communication server system 108 via the network 106. The data exchanged between communication client application 104, and between a communication client application 104 and the communication server system 108, includes functions (e.g., commands to invoke functions) as well as payload data (e.g., text, audio, video or other multimedia data).

The communication server system 108 provides server-side functionality via the network 106 to a particular communication client application 104. While certain functions of the communication system 100 are described herein as being performed by either a communication client application 104 or by the communication server system 108, the location of certain functionality either within the communication client application 104 or the communication server system 108 is a design choice. For example, it may be technically preferable to initially deploy certain technology and functionality within the communication server system 108, but to later migrate this technology and functionality to the communication client application 104 where a Client device 102 has a sufficient processing capacity.

The communication server system 108 supports various services and operations that are provided to the communication client application 104. Such operations include transmitting data to, receiving data from, and processing data generated by the communication client application 104. This data may include, message content, Client Device information, geolocation information, media annotation and overlays, message content persistence conditions, social network information, and live event information, as examples. Data exchanges within the communication system 100 are invoked and controlled through functions available via user interfaces (UIs) of the communication client application 104.

Turning now specifically to the communication server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the Client device 102 and the application server 112. Specifically, the Application Program Interface (API) server 110 provides a set of interfaces (e.g., routines and protocols) that can be called or queried by the communication client application 104 in order to invoke functionality of the application server 112. The Application Program Interface (API) server 110 exposes various functions supported by the application server 112, including account registration, login functionality, the sending of messages, via the application server 112, from a particular communication client application 104 to another communication client application 104, the sending of media files (e.g., images or video) from a communication client application 104 to the communication server application 114, and for possible access by another communication client application 104, the setting of a collection of media data (e.g., story), the retrieval of a list of friends of a user of a Client device 102, the retrieval of such collections, the retrieval of messages and content, the adding and deletion of friends to a social graph, the location of friends within a social graph, and opening an application event (e.g., relating to the communication client application 104).

The application server 112 hosts a number of applications and subsystems, including a communication server application 114, an image processing system 116 and a social network system 122. The communication server application 114 implements a number of message processing technologies and functions, particularly related to the aggregation and other processing of content (e.g., textual and multimedia content) included in messages received from multiple instances of the communication client application 104. As will be described in further detail, the text and media content from multiple sources may be aggregated into collections of content (e.g., called stories or galleries). These collections are then made available, by the communication server application 114, to the communication client application 104. Other processor and memory intensive processing of data may also be performed server-side by the communication server application 114, in view of the hardware requirements for such processing.

The communication server application 114 also facilities context based augmented reality communication between users. In an example, the client device 102-2 is a wearable device (e.g., smart glasses) worn by the user 103-2 that includes a camera and optical elements that include a transparent display through which the real-world environment is visible to the user 103-2. The communication server application 114 may cause the client device 102-1 to display a set of selectable virtual content items that can be applied to the real-world environment that is visible to the user 103-2. Each virtual content item includes one or more media objects. A virtual content item selected by the user 103-1 can be applied to the real-world environment that is visible to the user 103-2 by causing one or more media objects to be displayed by the transparent display in the optical elements of the client device 102-2. In this way, the one or more media objects appear to the first user as though they exist in the real-world environment. Further, the user 103-1 may establish a set of context-based criteria (e.g., time, location, or objects within the real-world environment) to be used to trigger application of the virtual content item to the real-world environment that is visible to the user 103-2. Further details regarding context-based augmented reality communication is discussed below.

The application server 112 also includes an image processing system 116 that is dedicated to performing various image processing operations, typically with respect to images or video generated and displayed by instances of the client device 102-2. For example, in instances in which the user 103-1 defines a criterion for applying a virtual content item to a view of the user 103-2 that involves a particular object being present in the view of the user 103-2, the image processing system 116 may perform one of many known image analysis techniques for identifying objects in image data generated at the client device 102-2.

The social network system 122 supports various social networking functions services, and makes these functions and services available to the communication server application 114. To this end, the social network system 122 maintains and accesses an entity graph within the database 120. Examples of functions and services supported by the social network system 122 include the identification of other users of the communication system 100 with which a particular user has relationships or is "following", and also the identification of other entities and interests of a particular user.

The application server 112 is communicatively coupled to a database server 118, which facilitates access to a database 120 in which is stored data associated with messages processed by the communication server application 114.

Figure 2:
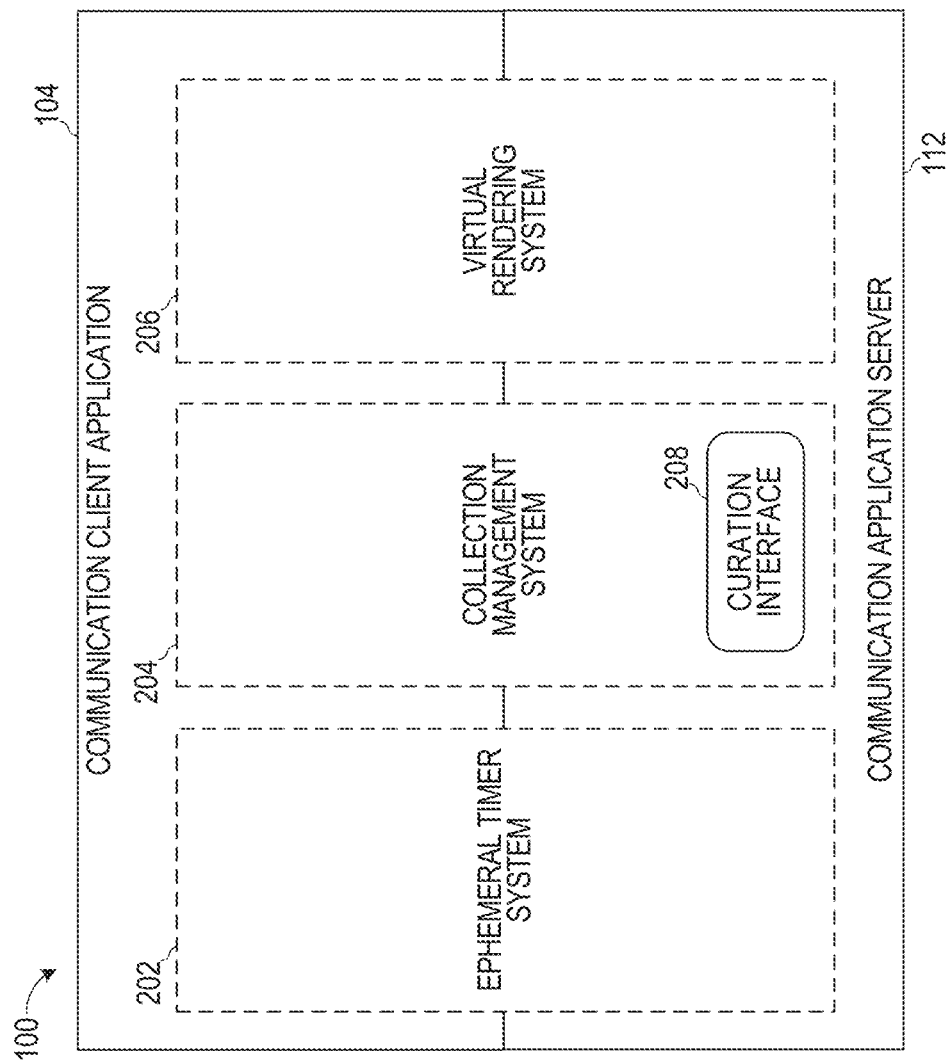
FIG. 2 is a diagrammatic representation of a communication system, in accordance with some example embodiments.

FIG. 2 is block diagram illustrating further details regarding the communication system 100, according to example embodiments. Specifically, the communication system 100 is shown to comprise the communication client application 104 and the application server 112, which in turn embody a number of subsystems, namely an ephemeral timer system 202, a collection management system 204, and a virtual rendering system 206.

The ephemeral timer system 202 is responsible for enforcing temporary access to content permitted by the client application 104 and the application server 112. To this end, the ephemeral timer system 202 incorporates a number of timers that, based on duration and display parameters associated with a message, or collection of messages (e.g., a story), selectively display and enable access to messages and associated content via the client application 104.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection.

The virtual rendering system 206 provides various functions that enable a user to augment or otherwise modify or edit media content (e.g., comprising image data and/or audio data). For example, the virtual rendering system 206 provides functions related to application of virtual content items to real-world environments whether through display of media objects on transparent displays through which a real-world environment is visible or through augmenting image data to include media objects overlaid on real-world environments depicted therein. The virtual content items may comprise one or more media objects. The virtual content items may be stored in the database(s) 120 and accessed through the database server(s) 118.

An media object may be a real-time special effect and sound that may be added to an image or a video. Media objects, overlays, image transformations, augmented reality images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple media objects, a user can use a single video clip with multiple media objects to see how the different media objects will modify the stored clip. For example, multiple media objects that apply different pseudorandom movement models can be applied to the same content by selecting different media objects for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different media objects will look within different windows in a display at the same time. This can, for example, enable multiple windows with different pseudorandom animations to be viewed on a display at the same time.

Data and various systems using media objects or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Media objects thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a client application 104 operating on the client device 102. The transform system operating within the client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

Figure 3:
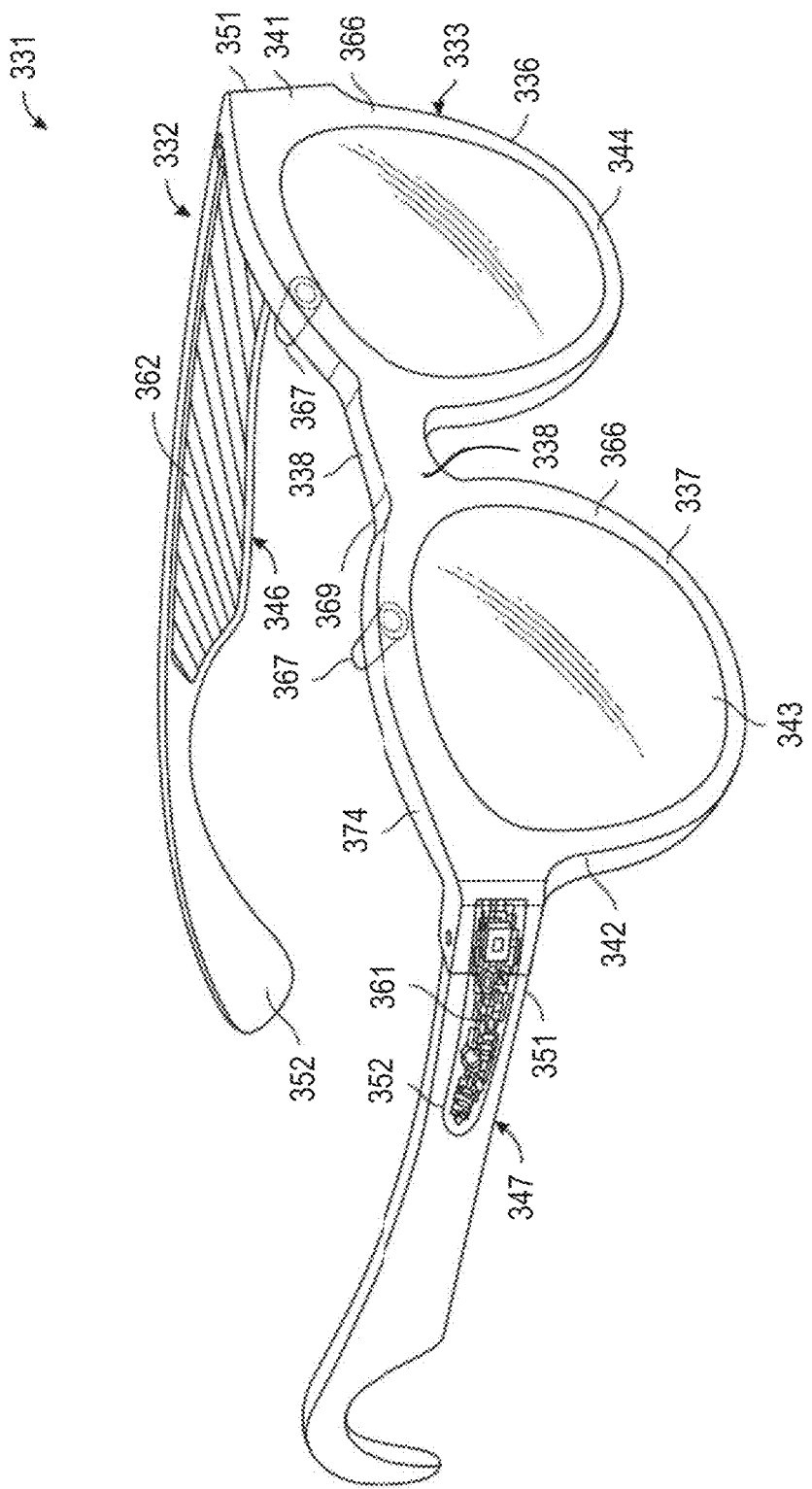
FIG. 3 is a diagram illustrating a wearable device for use in context-based augmented reality communication, according to some example embodiments.

FIG. 3 is a diagram illustrating a wearable device in the example form of glasses 331 for use in context-based augmented reality communication, according to some example embodiments. The glasses 331 can include a frame 332 made from any suitable material such as plastic or metal, including any suitable shape memory alloy. The frame 332 can have a front piece 333 that can include a first or left lens, display, or optical element holder 336 and a second or right lens, display, or optical element holder 337 connected by a bridge 338. The front piece 333 additionally includes a left end portion 341 and a right end portion 342. A first or left optical element 344 and a second or right optical element 343 can be provided within respective left and right optical element holders 336, 337. Each of the optical elements 343, 344 can be a lens, a display (e.g., a transparent display), a display assembly, or a combination of the foregoing. In some embodiments, for example, the glasses 331 are provided with an integrated near-eye display mechanism that enables, for example, display to the user of preview images for visual media captured by cameras 367 of the glasses 331. In some embodiments, integrated near-eye display mechanism allows for display of a media object such that the media object is overlaid on a real-world environment that is viewable through the optical elements 343 and 344.

The frame 332 additionally includes a left arm or temple piece 346 and a right arm or temple piece 347 coupled to the respective left and right end portions 341, 342 of the front piece 333 by any suitable means, such as a hinge (not shown), so as to be coupled to the front piece 333, or rigidly or fixably secured to the front piece 333 so as to be integral with the front piece 333. Each of the temple pieces 346 and 347 can include a first portion 351 that is coupled to the respective end portion 341 or 342 of the front piece 333 and any suitable second portion 352, such as a curved or arcuate piece, for coupling to the ear of the user. In one embodiment, the front piece 333 can be formed from a single piece of material, so as to have a unitary or integral construction. In one embodiment, the entire frame 332 can be formed from a single piece of material so as to have a unitary or integral construction.

The glasses 331 can include a device, such as a computer 361, which can be of any suitable type so as to be carried by the frame 332 and, in one embodiment, of a suitable size and shape so as to be at least partially disposed in one of the temple pieces 346 and 347. In one embodiment, the computer 361 has a size and shape similar to the size and shape of one of the temple pieces 346, 347 and is thus disposed almost entirely if not entirely within the structure and confines of such temple pieces 346 and 347. In one embodiment, the computer 361 can be disposed in both of the temple pieces 346, 347. The computer 361 can include one or more processors with memory, wireless communication circuitry, and a power source. The computer 361 comprises low-power circuitry, high-speed circuitry, and a display processor. Various other embodiments may include these elements in different configurations or integrated together in different ways.

The computer 361 additionally includes a battery 362 or other suitable portable power supply. In one embodiment, the battery 362 is disposed in one of the temple pieces 346 or 347. In the glasses 331 shown in FIG. 3, the battery 362 is shown as being disposed in the left temple piece 346 and electrically coupled using a connection 374 to the remainder of the computer 361 disposed in the right temple piece 347. One or more I/O devices can include a connector or port (not shown) suitable for charging a battery 362 accessible from the outside of the frame 332, a wireless receiver, transmitter, or transceiver (not shown), or a combination of such devices. Given the limited size of the glasses 331 and the computer 361, resource-intensive operations such as video streaming can quickly drain the battery 362 and can be a strain on the one or more processors of the computer 361 that can lead to overheating.

The glasses 331 include digital cameras 367. Although two cameras 367 are depicted, other embodiments contemplate the use of a single or additional (i.e., more than two) cameras. For ease of description, various features relating to the cameras 367 will further be described with reference to only a single camera 367, but it will be appreciated that these features can apply, in suitable embodiments, to both cameras 367.

Consistent with some embodiments, the glasses 331 are an example instance of the client device 102 and may be worn by the user 103-1. Further, in these embodiments, the user 103-2 can view a live camera feed generated by the camera 367 and interact with the user 103-2 by causing virtual content items added to a real-world environment that is visible to the user 103-1 via the glasses 331. That is, one or more media objects corresponding to a virtual content item selected by the user 103-2 can be displayed by the integrated near-eye display mechanism that enables such that the media object is overlaid on a real-world environment that is viewable through the optical elements 343 and 344.

In various embodiments, the glasses 331 may include any number of input sensors or peripheral devices in addition to the cameras 367. The front piece 333 is provided with an outward-facing, forward-facing, front, or outer surface 366 that faces forward or away from the user when the glasses 331 are mounted on the face of the user, and an opposite inward-facing, rearward-facing, rear, or inner surface 369 that faces the face of the user (e.g., user 103-1) when the glasses 331 are mounted on the face of the user. Such sensors can include inward-facing video sensors or digital imaging modules such as cameras that can be mounted on or provided within the inner surface 369 of the front piece 333 or elsewhere on the frame 332 so as to be facing the user, and outward-facing video sensors or digital imaging modules such as the cameras 367 that can be mounted on or provided with the outer surface 366 of the front piece 333 or elsewhere on the frame 332 so as to be facing away from the user. Such sensors, peripheral devices, or peripherals can additionally include biometric sensors, location sensors, accelerometers, or any other such sensors.

The glasses 331 further include an example embodiment of a camera control mechanism or user input mechanism comprising a camera control button mounted on the frame 332 for haptic or manual engagement by the user. The camera control button provides a bi-modal or single-action mechanism in that it is disposable by the user between only two conditions, namely an engaged condition and a disengaged condition. In this example embodiment, the camera control button is a pushbutton that is by default in the disengaged condition, being depressible by the user to dispose it to the engaged condition. Upon release of the depressed camera control button, it automatically returns to the disengaged condition.

In other embodiments, the single-action input mechanism can instead be provided by, for example, a touch-sensitive button comprising a capacitive sensor mounted on the frame 332 adjacent to its surface for detecting the presence of a user's finger to dispose the touch-sensitive button to the engaged condition when the user touches a finger to the corresponding spot on the outer surface of the frame 332. It will be appreciated that the above-described camera control button and capacitive touch button are but two examples of a haptic input mechanism for single-action control of the camera 367 and that other embodiments may employ different single-action haptic control arrangements.

Figure 4:
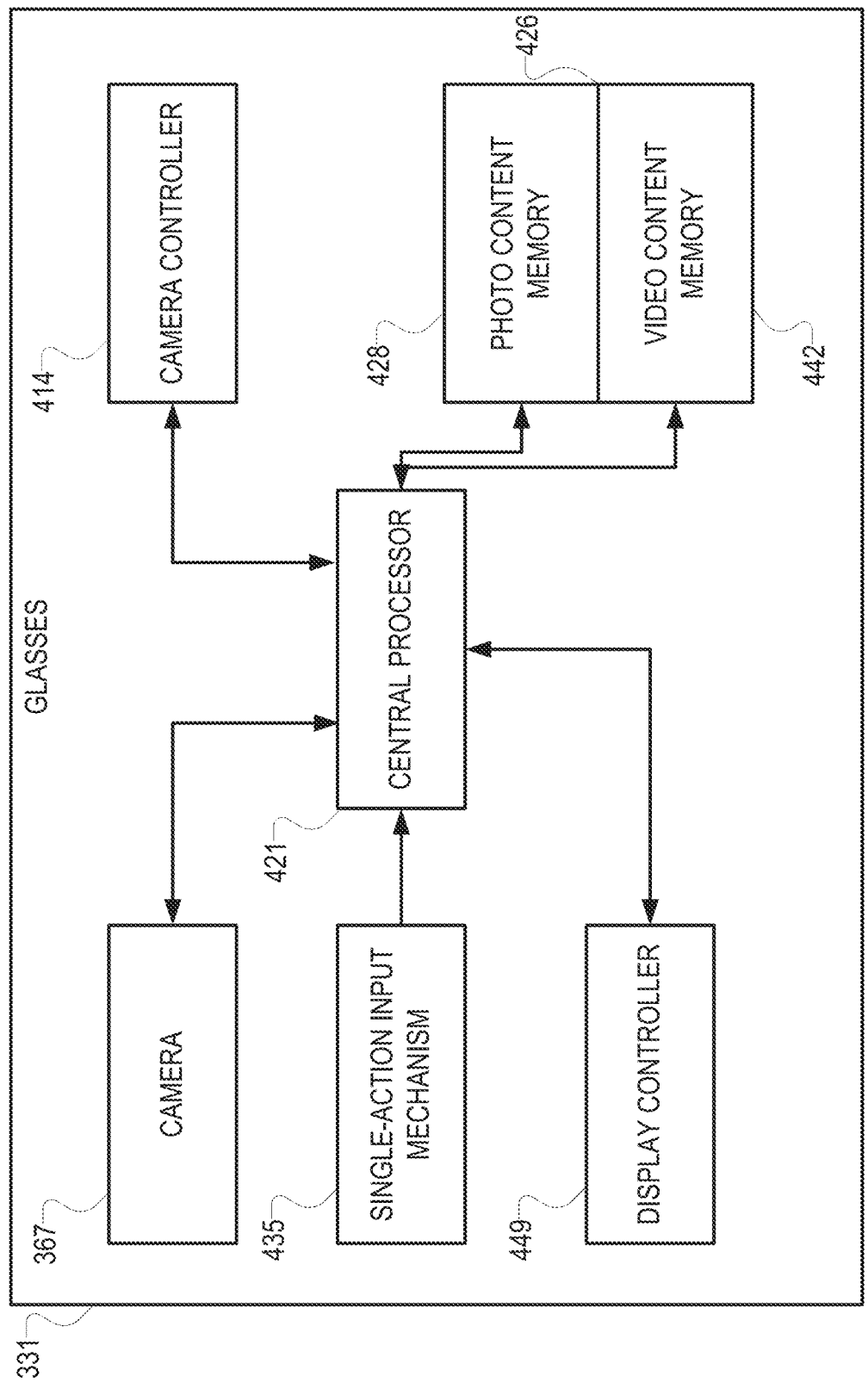
FIG. 4 is a block diagram illustrating aspects of the wearable device, according to some example embodiments.

FIG. 4 is a block diagram illustrating aspects of the wearable device in the example form of the glasses 331, according to some example embodiments. The computer 361 of the glasses 331 includes a central processor 421 in communication with an onboard memory 426. The central processor 421 may be a CPU and/or a graphics processing unit (GPU). The memory 426 in this example embodiment comprises a combination of flash memory and random-access memory.

The glasses 331 further include a camera controller 414 in communication with the central processor 421 and the camera 367. The camera controller 414 comprises circuitry configured to control recording of either photographic content or video content based upon processing of control signals received from the single-action input mechanism that includes the camera control button, and to provide for automatic adjustment of one or more image-capture parameters pertaining to capturing of image data by the camera 367 and on-board processing of the image data prior to persistent storage thereof and/or to presentation thereof to the user for viewing or previewing.

In some embodiments, the camera controller 414 comprises permanently configured circuitry, such as firmware or an application-specific integrated circuit (ASIC) configured to perform the various functions described herein. In other embodiments, the camera controller 414 may comprise a dynamically reconfigurable processor executing instructions that temporarily configure the processor to execute the various functions described herein.

The camera controller 414 interacts with the memory 426 to store, organize, and present image content in the form of photo content and video content. To this end, the memory 426 in this example embodiment comprises a photo content memory 428 and a video content memory 442. The camera controller 414 is thus, in cooperation with the central processor 421, configured to receive from the camera 367 image data representative of digital images produced by the camera 367 in accordance with some of the image-capture parameters, to process the image data in accordance with some of the image-capture parameters, and to store the processed image data in an appropriate one of the photo content memory 428 and the video content memory 442.

The camera controller 414 is further configured to cooperate with a display controller 449 to cause display on a display mechanism incorporated in the glasses 331 of selected photos and videos in the memory 426 and thus to provide previews of captured photos and videos. In some embodiments, the camera controller 414 will manage processing of images captured using automatic bracketing parameters for inclusion in a video file.

A single-action input mechanism 435 is communicatively coupled to the central processor 421 and the camera controller 414 to communicate signals representative of a current state of the camera control button and thereby to communicate to the camera controller 414 whether or not the camera control button is currently being pressed. The camera controller 414 further communicates with the central processor 421 regarding the input signals received from the single-action input mechanism 435. In one embodiment, the camera controller 414 is configured to process input signals received via the single-action input mechanism 435 to determine whether a particular user engagement with the camera control button is to result in a recording of video content or photographic content and/or to dynamically adjust one or more image-capture parameters based on processing of the input signals. For example, pressing of the camera control button for longer than a predefined threshold duration causes the camera controller 414 automatically to apply relatively less rigorous video processing to captured video content prior to persistent storage and display thereof. Conversely, pressing of the camera control button for shorter than the threshold duration in such an embodiment causes the camera controller 414 automatically to apply relatively more rigorous photo stabilization processing to image data representative of one or more still images.

The glasses 331 may be a stand-alone client device that is capable of independent operation or may be a companion device that works with a primary device to offload intensive processing and/or exchange data over the network 106 with the communication server system 108. The glasses 331 may further include various components common to mobile electronic devices such as smart glasses or smart phones (for example, including a display controller for controlling display of visual media (including photographic and video content captured by the camera 367) on a display mechanism incorporated in the device). Note that the schematic diagram of FIG. 4 is not an exhaustive representation of all components forming part of the glasses 331.

Figure 5:
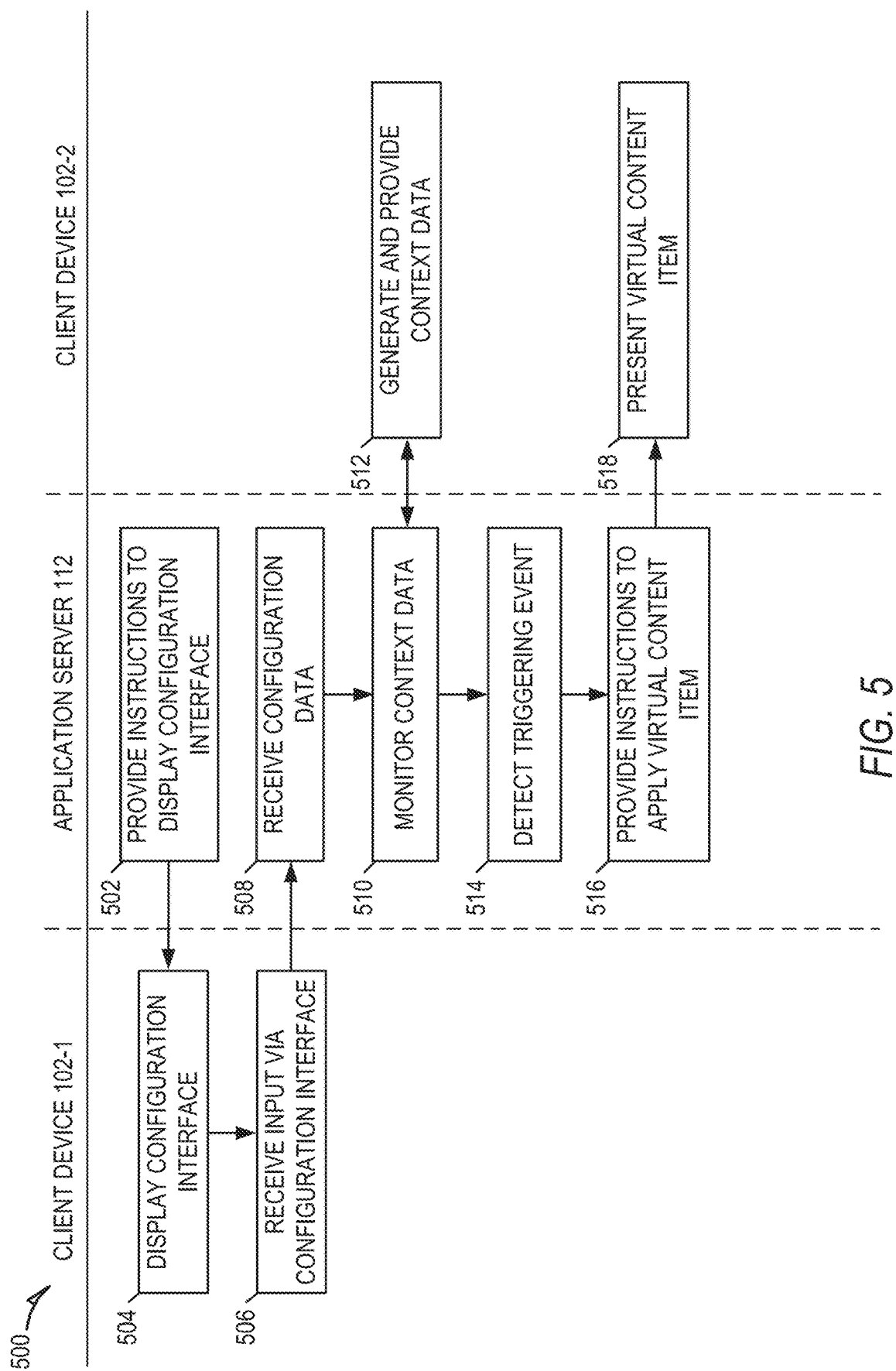
FIG. 5 is an interaction diagrams illustrating example interactions between components of the communication system in performing a method for facilitating context-based augmented reality communication between two users, according to example embodiments.

FIG. 5 is an interaction diagrams illustrating example interactions between a first device (client device 102-1), a second device (client device 102-2), and a server (application server 112) of the communication system in performing a method 500 for facilitating context-based augmented reality communication between a first user (user 103-1) associated with the first device (client device 102-1) and a second user (user 103-2) associated with the second device (client device 102-2), according to example embodiments.

As shown, the method 500 begins at operation 502 where the application server 112 provides instructions to the client device 102-1 to display a virtual content item configuration interface. The client device 102-1 displays the virtual content item configuration interface, at operation 504. To cause the client device 102-1 to display the virtual content item configuration interface, the application server 112 transmits a set of instructions to the client device 102-1 that, when executed by client device 102-1, causes the client device 102-1 to display the virtual content item configuration interface. It shall be appreciated that, in some embodiments, the client device 102-1 may display the virtual content item configuration interface without receiving instructions from the application server 112. In these embodiments, a client application 104) executing on the client device 102-1 causes the client device 102-1 to display the virtual content item configuration interface using locally stored data.

The virtual content item configuration interface allows the user 103-1 to select a virtual content item to apply to a real-world environment that is visible to the user 103-2. To this end, the virtual content item configuration interface includes a set of selectable virtual content items, an element to receive one or more user identifiers corresponding to users who are to receive the virtual content item, and one or more elements for defining criteria to trigger application of the virtual content item to the real-world environment.

The application server 112 receives input via the virtual content item configuration interface, at operation 506. The input includes an identifier corresponding to the user 103-2, a virtual content item selected by the user 103-1, and one or more criteria to trigger application of the virtual content item to a real-world environment that is visible to the user 103-2 via the client device 102-2.

The client device 102-1 provides virtual content item configuration data generated based on the input received via the virtual content item configuration interface to the application server 112, which is received at operation 508. The virtual content item configuration data includes the identifier corresponding to the user 103-2, the virtual content item selected by the user 103-1, and the one or more criteria to trigger application of the virtual content item.

In response to receiving the virtual content item configuration data, the application server 112, at operation 510, monitors context data associated with the client device 102-2, at least some of which is generated at the client device 102-2 (at operation 512) to detect an event to trigger application of the virtual content item based on the one or more criteria. The application server 112 monitors context data associated with the client device 102-2 specifically based on the identifier of the user 103-2 associated with the client device 102-2 being included in the virtual content item configuration data. The context data provides information related to an environment surrounding the client device 102-2 worn by the user 103-2. The context data may, for example, include: user input data; biometric data; motion data; environmental data; position data; temporal data; weather data; event data describing an event; location data describing a location of the client device 102-2; image data generated at client device 102-2; and audio data produced by at the device.

At operation 514, the application server 112 detects a triggering event based on the context data. More specifically, the application server 112 detects a triggering event based on the context data satisfying the one or more criteria established by the user 103-1 in configuring the virtual content item.

Based on detecting the triggering event, the application server 112, at operation 516, provides instructions to the client device 102-2 that causes the client device 102-2 to display the virtual content item overlaid on the real-world environment that is visible to the user 103-2, at operations 516. The instructions provided to the client device 102-2 cause the client device 102-2 to present the virtual content item on a transparent display (e.g., embedded in glasses 331) through which the real-world environment is visible to the user 103-2, at operation 518.

Figure 6:
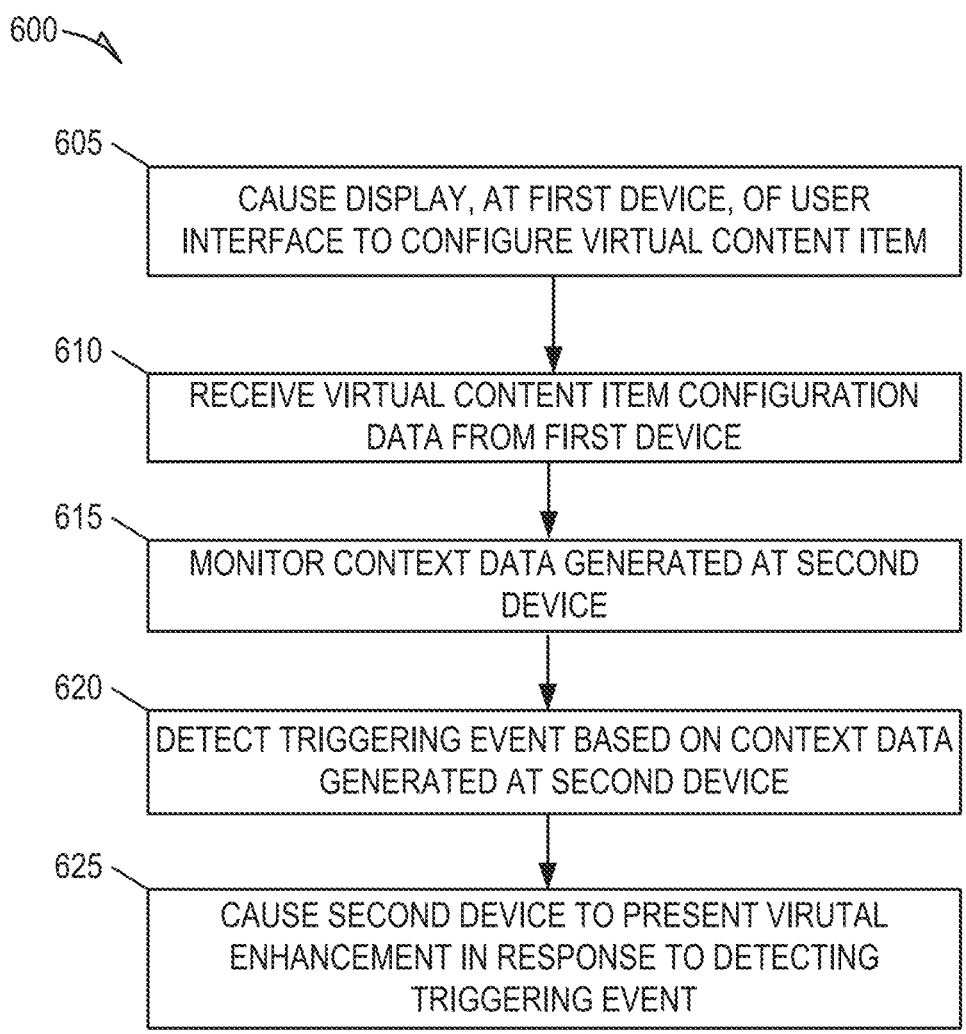
FIG. 6 is flowcharts illustrating operations of the communication system in performing a method for facilitating context-based augmented reality communication between two users, according to example embodiments.

FIG. 6 are flowcharts illustrating operations of the communication system in performing a method 600 for facilitating a context based augmented reality communication between users, according to example embodiments. The method 600 may be embodied in computer-readable instructions for execution by one or more processors such that the operations of the method 600 may be performed in part or in whole by the functional components of the communication system 100; accordingly, the method 600 is described below by way of example with reference thereto. However, it shall be appreciated that at least some of the operations of the method 600 may be deployed on various other hardware configurations than the communication system 100.

At operation 605, the application server 112 causes display of a virtual content item configuration interface on a first device (e.g., client device 102-1). The first device is associated with a first user (e.g., user 103-1). The virtual content item configuration interface allows the first user to select a virtual content item to apply to a real-world environment that is visible to one or more users. To this end, the virtual content item configuration interface includes a set of selectable virtual content items and an element to receive one or more user identifiers corresponding to users who are to receive the virtual content item. Each virtual content item comprises one or more media objects. Media objects may be two or three dimensional.

The virtual content item configuration interface also includes one or more elements for defining criteria to trigger application of the virtual content item to the real-world environment. Accordingly, the virtual content item configuration interface may include a combination of input fields, toggles, and other user interface input elements that can be used to specify virtual content item criteria. The criteria for triggering application of the virtual content item relate to contextual information about an environment surrounding a device at which the virtual content item is to be presented to user. For example, the criteria may be based on one or more of: user input data; biometric data; motion data; environmental data; position data; temporal data; event data describing an event; location data describing a location of the device; a visual attribute of image data generated at the device; an object detected in image data generated at the device; an action or gesture detected image data generated at the device; weather conditions data; audio data produced by at the device; or a gaze of a user of the device.

In some embodiments, the virtual content item configuration interface may present a set of objects from which the first user may select an object to establish as a trigger for the virtual content item. In other words, the virtual content item configuration interface may allow the first user to establish one or more criteria for triggering the virtual content item based on the appearance of one or more objects in the real-world environment of the second user.

In some instances, a virtual content item may include one or more customizable parameters that determine the appearance of the virtual content item. For example, some virtual content items may include customizable stylizations and behaviors. The stylizations may, for example, include any one or more of: a color; a texture; a size; an object geometry; an opacity; a typography; a typographical emphasis; an adornment; or an additional virtual representation related to the virtual content item. The behavior of the virtual content item may correspond to an animated movement or action of the virtual content item. In instances in which a virtual content item with customizable parameters is selected by the first user, the virtual content item configuration interface may further provide interactive elements that are operable to customize the parameters.

To cause the first device to display the virtual content item configuration interface, the application server 112 transmits a set of instructions to the first device that, when executed by the first device, causes the first device to display the virtual content item configuration interface. It shall be appreciated that, in some embodiments, the first device may display the virtual content item configuration interface without receiving instructions from the application server 112. In these embodiments, a client application (e.g., client application 104) executing on the first device causes the first device to display the virtual content item configuration interface using locally stored data.

At operation 610, the application server 112 receives virtual content item configuration data from the first device. The virtual content item configuration data includes input data corresponding to user input received via the virtual content item configuration interface. The virtual content item configuration data comprises a virtual content item selected by the first user, a user identifier corresponding to a second user who is to receive the virtual content item, and one or more criteria for triggering application of the virtual content item to a real-world environment that is visible to the second user via a second device. As noted above, the virtual content item includes one or more media objects. The one or more criteria may specify a particular state or value of contextual data associated with the second device. For example, the criteria specify a location at which the virtual content item is to be applied, a time at which the virtual content item is to be applied, or an object within the real-world environment to trigger application of the virtual content item. The virtual content item configuration data may further, in some instances, include data describing one or more customizable parameters of the virtual content item.

At operation 615, the application server 112 monitors context data associated with the second device. The monitored context data includes context data generated at the second device as well as context data generated by the application server 112 or obtained by the application server 112 from one or more third party sources. That is, the application server 112 may monitor any one or more of: user input data; biometric data; motion data; environmental data; position data; temporal data; event data describing an event; location data describing a location of the second device; image data generated at the second device; and audio data produced by at the device.

The application server 112 monitors the context data to detect a triggering event to apply the virtual content item to a real-world environment that is visible to the second user. The application server 112 monitors the second device specifically based on the inclusion of the user identifier of the second user in the virtual content item configuration data. That is, the inclusion of user identifier of the second user indicates that the second user is to receive the virtual content item in accordance with the one or more criteria.

At operation 620, the application server 112 detects a triggering event based on satisfaction of the one or more criteria included in the virtual content item configuration data determined from the context data associated with the second device. For example, the one or more criteria may specify a location, and the application server 112 detects the triggering event based on location data generated at the second device indicating that the second device is at the location. As another example, the one or more criteria may specify a trigger time at which to apply the virtual content item and the application server 112 detects the triggering event based on the current time corresponding to the trigger time. As yet another example, the one or more criteria may specify an object in the real-world environment and the application server 112 detects the triggering event based on an analysis of image data depicting the real-world environment generated at the second device indicating that the object is in the real-world environment. To further this example, the application server 112 may, in analyzing the image data, perform one or more known object recognition techniques to identify the object.

In some embodiments, the application server 112 detects the triggering event directly based on analysis of the context data. In some embodiments, the second device may detect the triggering event and send an indication of the triggering event to the application server 112.

At operation 625, the application server 112 causes the second device to present the one or more media objects overlaid on the real-world environment that is visible to the second user based on the selected virtual content item. The application server 112 may maintain object definition data that defines the display of the virtual content item including any customizable parameters and in causing display of the one or more media objects, the application server 112 may provide the second devices with the virtual content item definition data along with a set of instructions that causes the second device to present the one or more media objects overlaid on the real-world environment in accordance with the virtual content item definition data.

In some embodiments, the second device is a wearable device worn by the second user that includes optical elements that include a transparent display device. Consistent with these embodiments, the application server 112 causes the transparent display device to display the one or more media objects while allowing the second user to continue to view the real-world environment through the device. In this manner, the one or more media objects are presented by the transparent display device overlaid on the real-world environment.

Software Architecture

Figure 7:
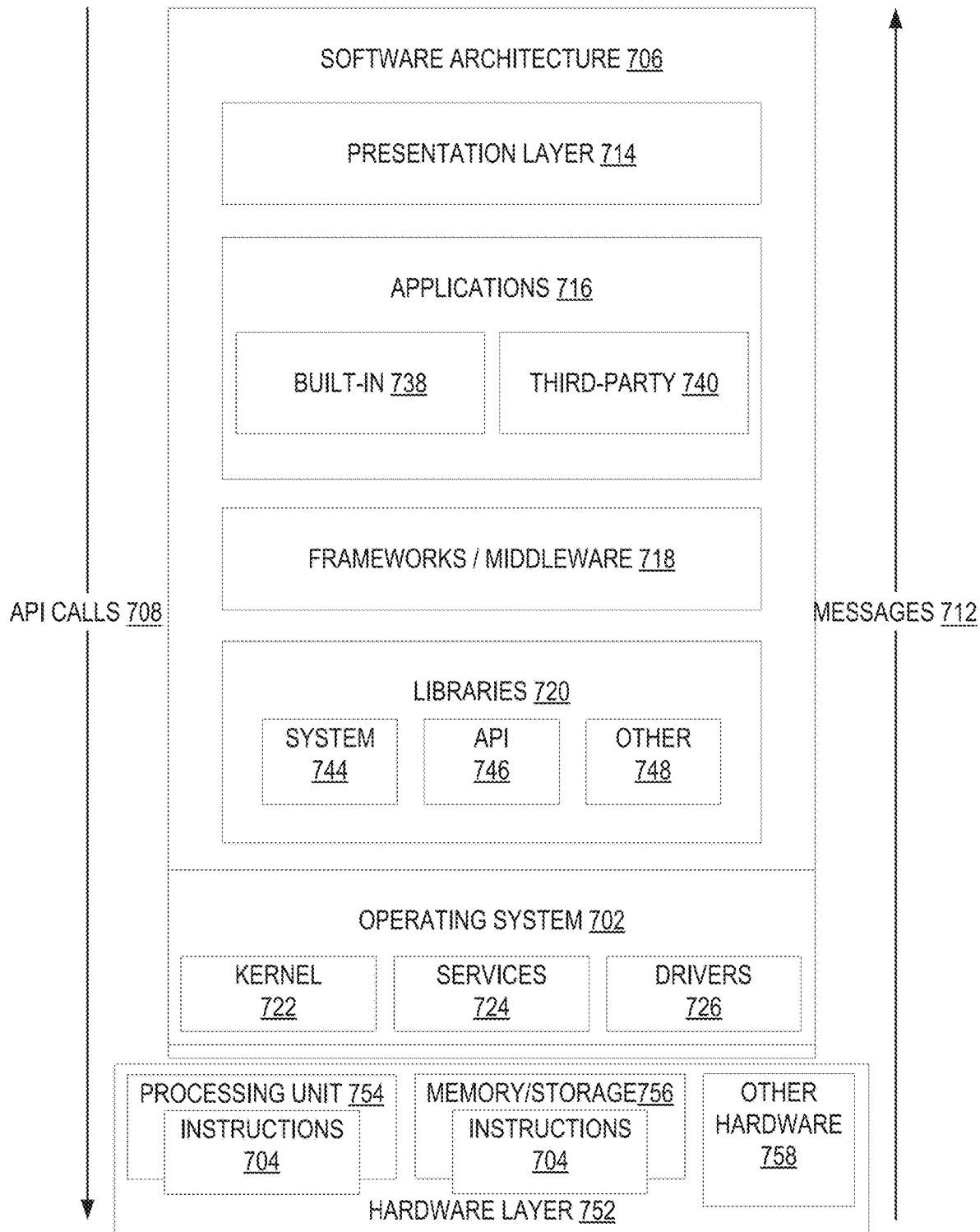
FIG. 7 is a block diagram illustrating a representative software architecture, which may be used in conjunction with various hardware architectures herein described, according to example embodiments.

FIG. 7 is a block diagram illustrating an example software architecture 706, which may be used in conjunction with various hardware architectures herein described. FIG. 7 is a non-limiting example of a software architecture, and it will be appreciated that many other architectures may be implemented to facilitate the functionality described herein. The software architecture 706 may execute on hardware such as a machine 800 of FIG. 8 that includes, among other things, processors 804, memory/storage 806, and I/O components 818. A representative hardware layer 752 is illustrated and can represent, for example, the machine 800 of FIG. 8. The representative hardware layer 752 includes a processing unit 754 having associated executable instructions 704. The executable instructions 704 represent the executable instructions of the software architecture 706, including implementation of the methods, components, and so forth described herein. The hardware layer 752 also includes memory and/or storage modules 756, which also have the executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke API calls 708 through the software stack and receive a response to the API calls 708 as messages 712. The layers illustrated are representative in nature and not all software architectures have all layers. For example, some mobile or special-purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than by interfacing directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media formats such as MPEG4, H.294, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 provide a higher-level common infrastructure that may be used by the applications 716 and/or other software components/modules. For example, the frameworks/middleware 718 may provide various GUI functions, high-level resource management, high-level location services, and so forth. The frameworks/middleware 718 may provide a broad spectrum of other APIs that may be utilized by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. The third-party applications 740 may include an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 740 may invoke the API calls 708 provided by the mobile operating system (such as the operating system 702) to facilitate functionality described herein.

The applications 716 may use built-in operating system functions (e.g., kernel 722, services 724, and/or drivers 726), libraries 720, and frameworks/middleware 718 to create user interfaces to interact with users of the system. Alternatively, or additionally, in some systems interactions with a user may occur through a presentation layer, such as the presentation layer 714. In these systems, the application/component "logic" can be separated from the aspects of the application/component that interact with a user.

Figure 8:
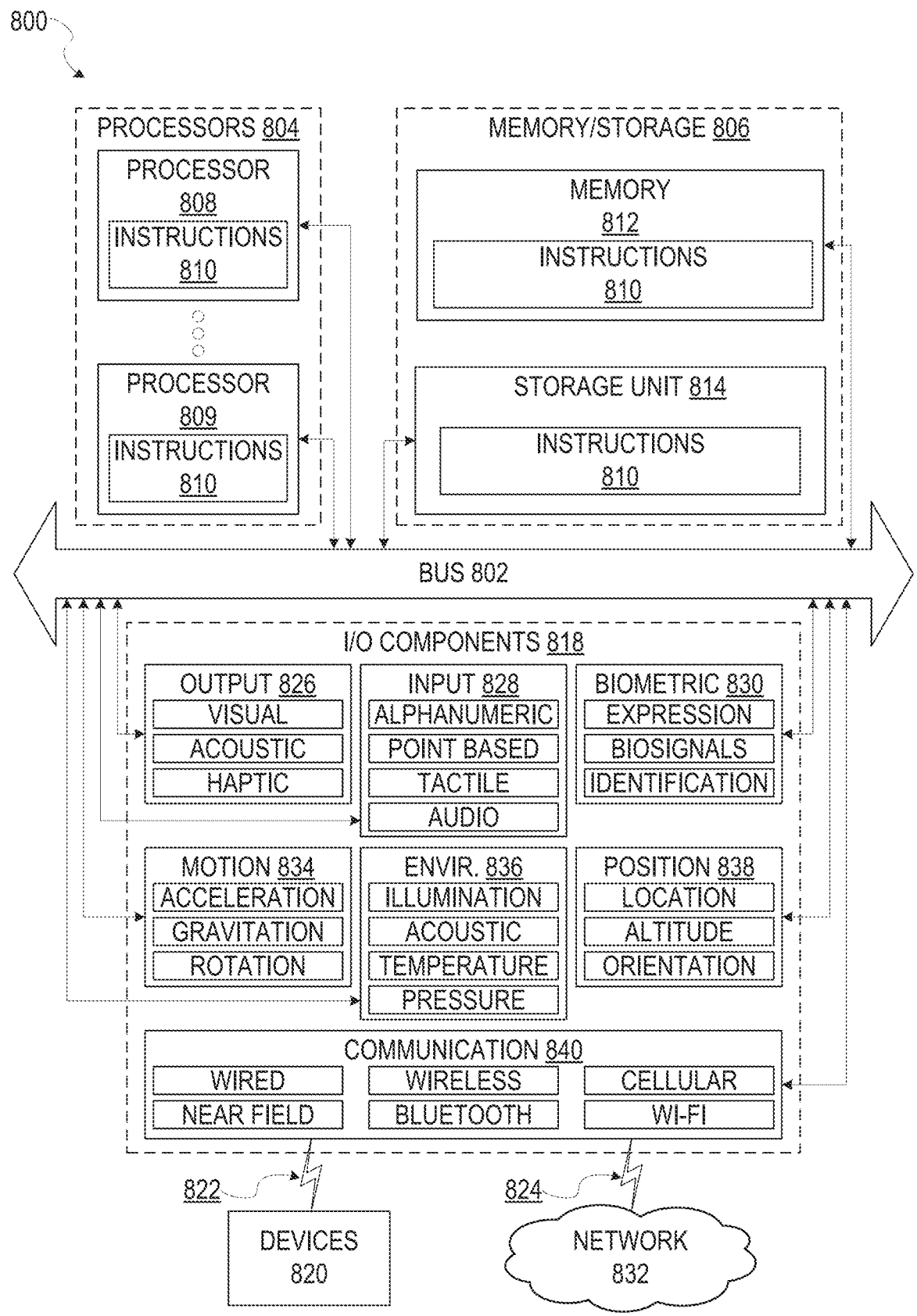
FIG. 8 is a block diagram illustrating components of a machine able to read instructions from a machine-readable medium (e.g., a machine-readable storage medium) and perform any one or more of the methodologies discussed herein, according to example embodiments.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. In an example embodiment, the processors 804 (e.g., a CPU, a reduced instruction set computing (RISC) processor, a complex instruction set computing (CISC) processor, a (GPU, a digital signal processor (DSP), an ASIC, a radio-frequency integrated circuit (RFIC), another processor, or any suitable combination thereof) may include, for example, a processor 808 and a processor 809 that may execute the instructions 810. Although FIG. 8 shows multiple processors 804, the machine 800 may include a single processor with a single core, a single processor with multiple cores (e.g., a multi-core processor), multiple processors with a single core, multiple processors with multiple cores, or any combination thereof.

The memory/storage 806 may include a memory 812, such as a main memory, or other memory storage, and a storage unit 814, both accessible to the processors 804 such as via the bus 802. The storage unit 814 and memory 812 store the instructions 810 embodying any one or more of the methodologies or functions described herein. The instructions 810 may also reside, completely or partially, within the memory 812, within the storage unit 814, within at least one of the processors 804 (e.g., within the processor's cache memory), or any suitable combination thereof, during execution thereof by the machine 800. Accordingly, the memory 812, the storage unit 814, and the memory of the processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion, and the grouping is in no way limiting. In various example embodiments, the I/O components 818 may include output components 826 and input components 828. The output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

The input components 828 may include alphanumeric input components (e.g., a keyboard, a touch screen display configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen display that provides location and/or force of touches or touch gestures, or other tactile input components), audio input components (e.g., a microphone), and the like.

In further example embodiments, the I/O components 818 may include biometric components 830, motion components 834, environment components 836, or position components 838, among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 may include acceleration sensor components (e.g., accelerometer), gravitation sensor components, rotation sensor components (e.g., gyroscope), and so forth. The environment components 836 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 838 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via a coupling 824 and a coupling 822, respectively. For example, the communication components 840 may include a network interface component or other suitable device to interface with the network 832. In further examples, the communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4114, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, (for example, giving date and time of day) sometimes accurate to a small fraction of a second.

What is claimed is:

1. A method comprising:
   causing display, at a first device of a first user, of an interactive interface comprising interactive elements to specify virtual content item configuration data, the interactive interface comprising:
   a first interactive element comprising a set of selectable virtual content items;
   a second interactive element to specify a weather condition to trigger application of a virtual content item selected from the set of selectable virtual content items to a real-world environment that is visible to a second user via optical elements of a second device; and
   a third interactive element comprising a selectable set of real-world objects to trigger application of the virtual content item to the real-world environment;
   receiving, from the first device of the first user, the virtual content item configuration data comprising a selection by the first user, from the selectable set of virtual content items, of the virtual content item to apply to the real-world environment that is visible to the second user via the optical elements of the second device, the virtual content item configuration data further specifying criteria for triggering application of the virtual content item to the real-world environment, the virtual content item comprising one or more media objects, the criteria including a first criterion comprising the weather condition specified by the first user via the second interactive element and a second criterion comprising a real-world object selected by the first user from the selectable set of real-world objects of the interactive interface;
   detecting a triggering event based on:
   determining the criterion specifying the weather condition associated with the real-world environment is satisfied based on weather data associated with the real-world environment, and
   detecting, in the real-world environment that is visible to the second user, the real-world object selected by the first user from the selectable set of real-world objects of the interactive interface based on an analysis of image data generated by a camera of the second device; and
   based on detecting the triggering event, causing, by one or more processors, the optical elements of the second device to present the one or more media objects overlaid on the real-world environment that is visible to the second user via the optical elements of the second device.

2. The method of claim 1, wherein:
   the criteria include a third criterion that specifies a state or value of contextual data associated with the second device;
   the method further comprises monitoring the contextual data associated with the real-world environment to detect satisfaction of the second criterion.

3. The method of claim 2, wherein the monitoring of the contextual data further comprises monitoring one or more of: user input data; motion data; environmental data; position data; temporal data; event data describing an event; location data describing a location of the second device; the image data generated at the second device; and audio data produced at the second device.

4. The method of claim 1, wherein the virtual content item configuration data includes one or more customizable parameters for the virtual content item, the one or more customizable parameters of the virtual content item include one or more of: a behavior; an object geometry; and an additional virtual representation related to the virtual content item.

5. The method of claim 1, wherein the criteria include one or more of:
   a location of the second device; and
   a trigger time at which the virtual content item is to be applied to the real-world environment that is visible to the second user via the second device.

6. The method of claim 1, wherein:
   the one or more criteria indicate a location; and
   detecting the triggering event further comprises detecting the second device at the location based on location data generated at the second device.

7. The method of claim 1, wherein: the analysis of image data generated at the second device comprises performing one or more object recognition techniques.

8. The method of claim 1, wherein:
   the criteria specify a trigger time at which the virtual content item is to be applied to the real-world environment that is visible to the second user via the second device; and
   detecting the triggering event comprises determining a current time corresponds to the trigger time specified by the one or more criteria.

9. The method of claim 1, wherein:
   the virtual content item configuration data includes an identifier of a third user;
   the triggering event is a first triggering event; and
   the method further comprises:
   detecting a second triggering event based on contextual data received from a third device associated with the third user; and
   based on detecting the second triggering event, causing the third device to present the one or more media objects overlaid on a real-world environment that is visible to the third user via the third device.

10. The method of claim 1, wherein:
    the second device is a wearable device worn by the second user;
    the optical elements comprise a transparent display; and
    causing the optical elements of the second device to present the one or more media objects overlaid on real-world environment comprises causing the transparent display to present the one or more media objects.

11. A system comprising:
a memory that stores instructions; and
one or more processors configured by the instructions to perform operations comprising:
  causing display, at a first device of a first user, of an interactive interface comprising interactive elements to specify virtual content item configuration data, the interactive interface comprising:
    a first interactive element comprising a set of selectable virtual content items;
    a second interactive element to specify a weather condition to trigger application of a virtual content item selected from the set of selectable virtual content items to a real-world environment that is visible to a second user via optical elements of a second device; and
    a third interactive element comprising a selectable set of real-world objects to trigger application of the virtual content item to the real-world environment;
  receiving, from the first device of the first user, the virtual content item configuration data comprising a selection by the first user, from the selectable set of virtual content items, of the virtual content item to apply to the real-world environment that is visible to the second user via the optical elements of the second device, the virtual content item configuration data further specifying criteria for triggering application of the virtual content item to the real-world environment, the virtual content item comprising one or more media objects, the criteria including a first criterion comprising the weather condition specified by the first user via the second interactive element and a second criterion comprising a real-world object selected by the first user from the selectable set of real-world objects of the interactive interface;
  detecting a triggering event based on:
  determining the criterion specifying the weather condition associated with the real-world environment is satisfied based on weather data associated with the real-world environment, and
  detecting, in the real-world environment that is visible to the second user, the real-world object selected by the first user from the selectable set of real-world objects of the interactive interface based on an analysis of image data generated by a camera of the second device; and
  based on detecting the triggering event, causing the optical elements of the second device to present the one or more media objects overlaid on the real-world environment that is visible to the second user via the optical elements of the second device.

12. The system of claim 11, wherein:
the criteria include a third criterion that specifies a state or value of contextual data associated with the second device;
the operations further comprises monitoring the contextual data associated with the real-world environment to detect satisfaction of the second criterion.

13. The system of claim 12, wherein the monitoring of the contextual data comprises monitoring one or more of: user input data; motion data; environmental data; position data; temporal data; event data describing an event; location data describing a location of the second device; the image data generated at the second device; and audio data produced at the second device.

14. The system of claim 11, wherein the virtual content item configuration data includes one or more customizable parameters for the virtual content item, the one or more customizable parameters of the virtual content item include one or more of: a behavior; an object geometry; and an additional virtual representation related to the virtual content item.

15. The system of claim 11, wherein the criteria include one or more of:
a location of the second device; and
a trigger time at which the virtual content item is to be applied to the real-world environment that is visible to the second user via the second device.

16. The system of claim 11, wherein:
the one or more criteria indicate a location; and
detecting the triggering event comprises detecting the second device at the location based on location data generated at the second device.

17. The system of claim 11, wherein:
the analysis of image data generated at the second device comprises performing one or more object recognition techniques.

18. The system of claim 11, wherein:
the criteria specify a trigger time at which the virtual content item is to be applied to real-world environment that is visible to the second user via the second device; and
detecting the triggering event comprises determining a current time corresponds to the trigger time specified by the one or more criteria.

19. The system of claim 11, wherein:
the second device is a wearable device worn by the second user;
the optical elements of the wearable device comprise a transparent display; and
causing the second device to present the one or more media objects overlaid on the real-world environment comprises causing the transparent display to present the one or more media objects.

20. A machine-readable medium storing instructions that, when executed by a computer system, cause the computer system to perform operations comprising:
  causing display, at a first device of a first user, of an interactive interface comprising interactive elements to specify virtual content item configuration data, the interactive interface comprising:
    a first interactive element comprising a set of selectable virtual content items;
    a second interactive element to specify a weather condition to trigger application of a virtual content item selected from the set of selectable virtual content items to a real-world environment that is visible to a second user via optical elements of a second device; and
    a third interactive element comprising a selectable set of real-world objects to trigger application of the virtual content item to the real-world environment;
  receiving, from the first device of the first user, the virtual content item configuration data comprising a selection by the first user, from the selectable set of virtual content items, of the virtual content item to apply to the real-world environment that is visible to the second user via the optical elements of the second device, the virtual content item configuration data further specifying criteria for triggering application of the virtual content item to the real-world environment, the virtual content item comprising one or more media objects, the criteria including a first criterion comprising the weather condition specified by the first user via the second interactive element and a second criterion comprising a real-world object selected by the first user from the selectable set of real-world objects of the interactive interface;

detecting a triggering event based on:

determining the criterion specifying the weather condition associated with the real-world environment is satisfied based on weather data associated with the real-world environment, and detecting, in the real-world environment that is visible to the second user, the real-world object selected by the first user from the selectable set of real-world objects of the interactive interface based on an analysis of image data generated by a camera of the second device; and based on detecting the triggering event, causing the optical elements of the second device to present the one or more media objects overlaid on the real-world environment that is visible to the second user via the optical elements of the second device.

* * * * *

UNITED STATES PATENT AND TRADEMARK OFFICE
CERTIFICATE OF CORRECTION

| | | |
|---|---|---|
| PATENT NO. | : 12,211,156 B2 | Page 1 of 1 |
| APPLICATION NO. | : 18/163098 | |
| DATED | : January 28, 2025 | |
| INVENTOR(S) | : Smith et al. | |

It is certified that error appears in the above-identified patent and that said Letters Patent is hereby corrected as shown below:

On the Title Page

In Column 2, item [56], Line 1, delete "1011256597 A1" and insert --101256597 A-- therefor On page 2, in Column 1, item [56], Line 6, delete "WO-2019005703" and insert --WO-2019055703-- therefor On page 2, in Column 2, item [56], Line 33, delete "malled" and insert --mailed-- therefor Signed and Sealed this
Twenty-ninth Day of April, 2025

Coke Morgan Stewart
*Acting Director of the United States Patent and Trademark Office*